(12) United States Patent
Brown et al.

(10) Patent No.: US 8,549,409 B2
(45) Date of Patent: Oct. 1, 2013

(54) CUSTOMIZABLE WEB APPLICATION NAVIGATION

(75) Inventors: Tara L. Brown, Seattle, WA (US); Tao Huang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1118 days.

(21) Appl. No.: 11/709,595

(22) Filed: Feb. 22, 2007

(65) Prior Publication Data

US 2008/0209336 A1  Aug. 28, 2008

(51) Int. Cl.
*G06F 3/048* (2006.01)

(52) U.S. Cl.
USPC .................. 715/744; 715/206; 715/208

(58) Field of Classification Search
USPC .......................................... 715/744, 208, 206
See application file for complete search history.

(56) References Cited

U.S. PATENT DOCUMENTS

| | | | |
|---|---|---|---|
| 5,864,852 A | 1/1999 | Luotonen | |
| 5,911,145 A * | 6/1999 | Arora et al. | 715/207 |
| 6,133,915 A | 10/2000 | Arcuri et al. | |
| 6,233,600 B1 | 5/2001 | Salas et al. | |
| 6,256,031 B1 | 7/2001 | Meijer et al. | |
| 6,327,608 B1 | 12/2001 | Dillingham | |
| 6,408,298 B1 | 6/2002 | Van et al. | |
| 6,456,304 B1 * | 9/2002 | Angiulo et al. | 715/779 |
| 6,484,214 B1 | 11/2002 | Sundermier | |
| 6,735,623 B1 | 5/2004 | Prust | |
| 6,772,139 B1 * | 8/2004 | Smith, III | 707/3 |
| 6,947,991 B1 | 9/2005 | Burton et al. | |
| 6,957,417 B2 | 10/2005 | Turner et al. | |
| 7,111,243 B1 | 9/2006 | Ballard et al. | |
| 7,512,593 B2 | 3/2009 | Karklins et al. | |
| 7,552,189 B2 | 6/2009 | Mehra | |
| 2002/0054128 A1 | 5/2002 | Lau et al. | |
| 2002/0109718 A1 | 8/2002 | Mansour et al. | |
| 2003/0025931 A1 * | 2/2003 | Dorfman et al. | 358/1.15 |
| 2005/0015391 A1 | 1/2005 | Pohlan | |
| 2005/0039144 A1 | 2/2005 | Wada et al. | |
| 2005/0081165 A1 | 4/2005 | Sobeski et al. | |
| 2005/0086654 A1 | 4/2005 | Sumi et al. | |
| 2005/0131945 A1 | 6/2005 | Muller et al. | |
| 2005/0158697 A1 | 7/2005 | Nelson et al. | |
| 2005/0240558 A1 | 10/2005 | Gil et al. | |
| 2005/0262481 A1 | 11/2005 | Coulson | |
| 2006/0010230 A1 | 1/2006 | Karklins et al. | |
| 2006/0069689 A1 | 3/2006 | Karklins et al. | |
| 2006/0253794 A1 | 11/2006 | Wilson | |
| 2007/0073677 A1 | 3/2007 | Lamouline | |

OTHER PUBLICATIONS

Manber et al., "Experience with Personalization on YAHOO!," Communications of the ACM, Aug. 2000, vol. 43, No. 8, pp. 35-39.

(Continued)

*Primary Examiner* — Andrea Leggett

(57) ABSTRACT

A method for customizing display preferences for a web application. Ease of interaction with web content may be improved by customizing display preferences that affect the way content is rendered by a server and provided to a user. Elements of menus for navigation among web pages for various functions, for example, may be added, removed, reordered, renamed, rearranged in a hierarchy, hidden, or shown to help users tailor the functions to their needs and thus better aid them in using the web pages.

20 Claims, 7 Drawing Sheets

(56) References Cited

OTHER PUBLICATIONS

Ivan et al., "Using views for customizing reusable components in component-based frameworks," downloaded from http://ieeexplore.ieee.org/xpls/abs_all.jsp?arnumber=1210029, downloaded on Dec. 22, 2006, 1 page.

Staringer, "Constructing applications from reusable components," downloaded from http://ieeexplore.ieee.org/xpls/abs_all.jsp?arnumber=311062, downloaded on Dec. 22, 2006, 1 page.

Microsoft Corporation, Windows Live Toolbar Custom Button SDK, downloaded from http://msdn2.microsoft.com/en-us/library/aa336199(d=printer).aspx,, downloaded on Dec. 22, 2006, 1 page.

Vitharana, et al., "Design, Retrieval, and Assembly in Component-based Software Development," Communications of the ACM, Nov. 2003, vol. 46, No. 11.

Microsoft Corporation, Microsoft Internet Explorer, 1995-2004, Version 6.0, Figures 1-16.

"Windows SharePoint Services," product literature from Microsoft Windows Server 2003 website http://www.microsoft.com/windowsserver2003/technologies/sharepoint/default.mspx, printed out Aug. 17, 2005, 2 pgs.

"Internet Explorer Favorites 101: Create, Manage, and Organize Your Microsoft Internet Explorer Favorites" from http://websearch.about.com/od/internetresearch/a/favorites.htm printed Aug. 17, 2005, 3 pgs.

* cited by examiner

400

```
<ShellMap>

<ShellMapNode
            guid=\"6A703483-F725-47d1-A500-0288FF480331\"
            url=\"http://tarabugbashcom.tc2.iwslab.com\">
        <title></title>

<ShellMapNode guid=\"2003\" url=\"/WebBCM\">
                    <title>Business Contact Manager</title>
                </ShellMapNode>

<ShellMapNode guid=\"2017\" url=\"/Project\">
                    <title>Project Manager</title>
                </ShellMapNode>

<ShellMapNode guid=\"2010\" url=\"/Schedules\">
                    <title>Time Manager</title>
                </ShellMapNode>

<ShellMapNode guid=\"2023\" url=\"/Documents\">
                    <title>Document Manager</title>
                </ShellMapNode>

<ShellMapNode guid=\"2026\" url=\"/sales.aspx\">
                    <title>Sales</title>
                </ShellMapNode>

<ShellMapNode guid=\"2056\" url=\"/Workspaces.aspx\">
                    <title>Workspaces</title>
                </ShellMapNode>

<ShellMapNode guid=\"2039\" url=\"/cm.aspx\">
                    <title>Company Administration</title>
                </ShellMapNode>

</ShellMapNode>

</ShellMap>
```

FIG. 4

CUSTOMIZABLE WEB APPLICATION NAVIGATION

BACKGROUND

As more people gain access to the Internet, more information and functionality has been made available over the World Wide Web. For example, some computer program applications offering functionality for completing a specific task or range of tasks (e.g., word processing applications) that were once available only on personal computers or on terminals in a local area network are now available via the web. These web-based applications, also referred to herein as web applications, are growing in number and many offer functionality similar to that available by computer programs executing locally on personal computers.

Traditionally, web applications are accessible via a web browser and may offer many different types of functionality that may be available on many different web pages. For example, a web application offering business functionality to small businesses may have web pages offering functions such as a business contact manager for organizing client or vendor information, a project manager for organizing timelines and goals for products, and a time manager for organizing employee time and payroll. Each of these functions may be available through the same web application for a small business, but customers may interact with these functions through a different web page or different web pages of the web application (i.e., at least one web page for the business contact manager, and at least one different web page for the project manager).

Navigating between the web pages hosting different functions of a web application may be accomplished through the use of a navigation bar on the web pages. For example, a navigation bar on a "main menu" web page may comprise a list of elements. Each element may be a link to a web application component associated with a web application, such as a link directly to a web page or a link to a collection of web pages such as in a folder in a web server's file system. The folder may be configured to display a default web page when a user's web browser navigates to it. A web application component could also be a script containing instructions to be executed on either a client computer or a server to carry out a specific task or specific tasks.

Web pages may be associated with different functions of the web application, such as a business contact manager or a project manager. The navigation bar may then change depending on which web page the user is viewing. For example, when a user navigates away from the "main menu" web page, the navigation bar may change from a list of links to functions to a list of links to web application components for sub-functions. Exemplary sub-functions may be client contacts and vendor contacts, and each sub-function may have a web page for it within the collection of web pages for the business contact manager functionality.

The functions of web applications may be available to users based on a subscription service. In other words, an organization, such as a small business, may have a subscription to a web application, and the employees of the organization may be users of the web application. The exact functions made available to a user may vary depending on the type of subscription an organization has to the web application. For example, users whose organization has a "basic" subscription may have access to the business contact manager functionality of the above example, but the project manager functionality may only be available to those users whose organization has a "premium" subscription.

SUMMARY OF THE INVENTION

Applicants have appreciated that ease of interaction with web content may be improved by customizing display preferences that affect the way content is rendered by a server and provided to a user. Elements of menus for navigation among web application components offering various functions, for example, may be added, removed, reordered, renamed, rearranged in a hierarchy, hidden, or shown to help users tailor the functions to their needs and thus better aid them in using the web pages.

In one embodiment, there is provided a method comprising displaying to a user of a web application a web page comprising a list of elements. Each element is associated with at least one web application component. The web page also comprises at least one tool for editing the list of elements. Edits made to display preferences for the user for the list using the at least one tool are detected and stored. Then, based on the display preferences, a portion of a web page associated with the web application is rendered to show the elements in accordance with the user preferences.

In another embodiment, there is provided an apparatus comprising at least one computer-readable medium having encoded thereon a structure for storing computer-readable data. The structure comprises at least one element, and each element comprises a unique identifier for the element, a link to at least one web application component, and a title for the element. The structure also comprises any number of sub-element links, each sub-element link comprising a reference to a sub-element having the same structure as an element. In the structure, the order of sub-element links and the title of each element affect display preferences that are used in rendering a web page.

In a further embodiment, there is provided a computer apparatus comprising at least one computer-readable medium having encoded thereon computer-executable instructions which, when executed, instruct the computer apparatus to carry out a method. The method comprises retrieving a set of display preferences for a list of elements, each element associated with at least one web application component. A first web page is then rendered, based at least in part on the display preferences. The first web page comprises at least one tool for editing the display preferences and the list of elements. The first web page also comprises the list of elements. Edits made to the display preferences by a user of the web page are detected and stored, and, based at least in part on edited display preferences, a second web page comprising the list of elements is rendered.

BRIEF DESCRIPTION OF THE DRAWINGS

In the drawings:

FIG. 4 is an illustrative depiction of data in a data store that may be used in accordance with embodiments of the invention;

DETAILED DESCRIPTION

Web applications may offer a great deal of functionality to users, and this functionality may be spread across many web pages of a web application. These web pages may comprise a navigation bar having a list of elements, each element having a link to a web application component offering a specific function, which may be used by a user to navigate to different functions of the web application. Applicants have appreciated that users of a web application may use only some of the functions offered by the web application or may use some functions more than other functions. Applicants have also appreciated that interfaces for conventional web applications have been static and uncustomizable. Further, Applicants have appreciated that ease of interaction with web applications may be improved by offering customization of display of elements through which a user may access web components for the web applications.

In view of the foregoing, one embodiment of the invention is directed to a method for customizing display preferences for web applications which may be used by a server to render a web page.

Figure 1:
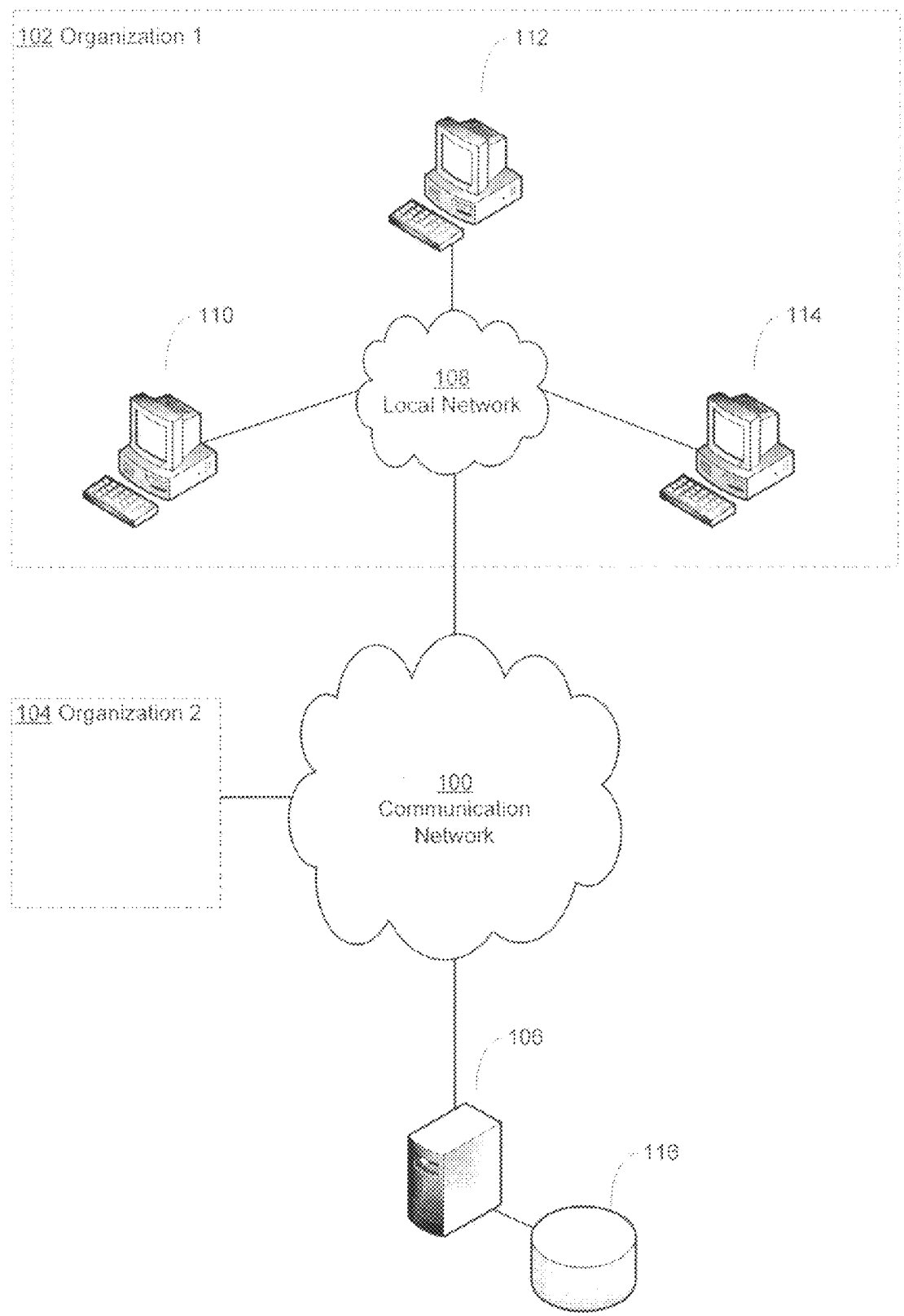
FIG. 1 is a diagram of an illustrative computer system environment in which embodiments of the invention may act.

The aspects of the present invention described herein can be implemented on any of numerous computer system configurations and are not limited to any particular type of configuration. FIG. 1 illustrates one example of a computer system on which aspects of the invention can be implemented, although others are possible.

The exemplary computer system of FIG. 1 includes a communication network 100, a server 106 on which a web application is hosted, an organization 1 102, and an organization 2 104. Communication network 100 can be any suitable wired and/or wireless communication medium or media for exchanging data between two or more computers (e.g., a server and a client), including the Internet. Server 106 is shown connected to computer-readable storage media 116. It should be appreciated that while only one server 106 and one storage media 116 is shown, embodiments of the invention may operate on computer systems comprising any number of servers and storage media. It should also be appreciated that while storage media 116 is shown as distinct from server 106, in embodiments of the invention server 106 will comprise storage media 116. Server 106 can be any suitable computing device for sending data to and receiving data from one or more client computing devices over a communication network. Storage media 116 can be any suitable storage medium or media.

Server 106 may be configured to render data stored within storage media 116 into a format readable by a web browser running on a client computer, such as client computers 110, 112, and 114. The act of rendering may comprise reading data from storage media 116 and transmitting it to a client computer. Alternatively, the act of rendering may comprise reading data from storage media 116, performing processing on the data, and transmitting it to a client computer. It should be appreciated that embodiments of the invention may perform any number or type of suitable processing acts on the data and that embodiments of the invention are not limited to any specific processing. An exemplary processing act, performed in accordance with some embodiments of the invention, is an act of translating raw data contained in a data file on storage media 116 into Hypertext Markup Language (HTML) data and transmitting it to the client computer as a portion of a web page.

An exemplary implementation of an organization is shown as organization 1 102, which comprises a local network 108 connecting three client computers 110, 112, and 114. Each of the client computers may communicate with server 106 through local network 108 and communication network 100, and, in some embodiments, comprise a storage medium or storage media having stored thereon a web browser for receiving, displaying, and interacting with web content such as web pages. Organization 2 104 may be similarly implemented, or implemented in any suitable manner for establishing a computer system within an organization. It should be appreciated that while organization 1 102 is shown having three client computers connected by a local network 108, an organization may be implemented with any number of client computers, including one client computer, and may or may not have a local network 108. Client computers 110, 112, and 114 can be any suitable computing device for sending and receiving data over a communication network, such as a desktop personal computer, a laptop personal computer, a personal digital assistant (PDA), a web-enabled television set, or a smart phone, among others.

Figure 2:
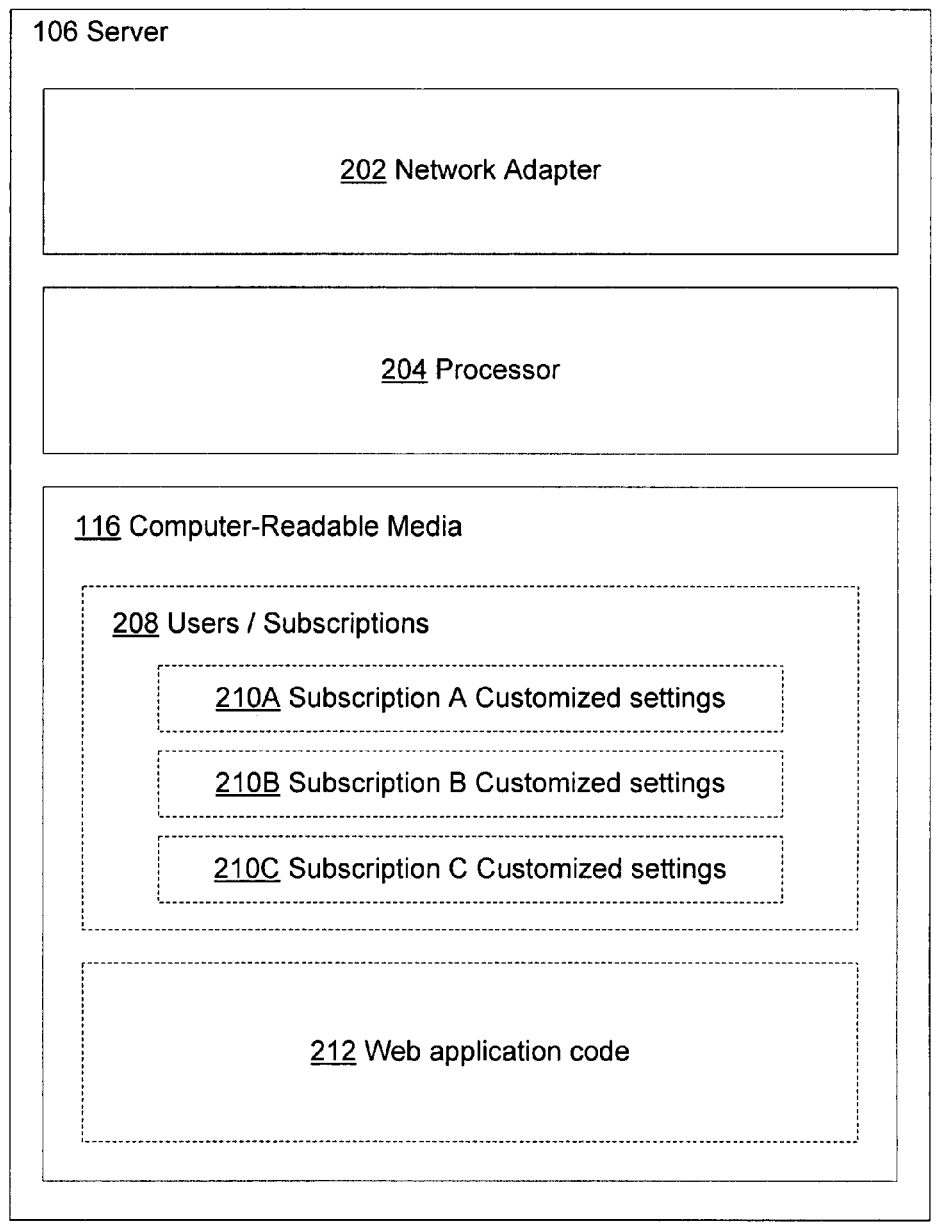
FIG. 2 is an exemplary computer server that may be used in accordance with embodiments of the invention.

FIG. 2 shows an illustrative server 106 that may be used in accordance with one or more embodiments of the invention. It should be appreciated that FIG. 2 is intended neither to be a depiction of necessary components for a computing device to operate as a server with embodiments of the invention nor a comprehensive depiction. Server 106 comprises network adapter 202 to communicate with other devices connected to network 100, such as user computer 110. Server 106 also, in accordance with some embodiments of the invention, comprises computer-readable storage media 116 for storing data to be processed and/or instructions to be executed by a processor 204. Processor 204 enables processing of data and execution of instructions. The data and instructions may be stored on the computer-readable storage media 116 and, for example, may enable communication between components of the server 106.

In accordance with some embodiments of the invention, the data and instructions stored on computer-readable media 116 may comprise information relating to subscriptions to a web application and the users having those subscriptions, as shown in data store 208. For example, organization 1 102 may have a subscription A to a web application hosted by server 106, and organization 2 104 may have a subscription B to the web application. Data store 208 may store information about users of the subscriptions, such as information relating to the users of client computers 10, 112, and 114 of organization 1 102. The data store further comprises customized settings for each subscription, as shown in elements 210A, 210B, and 210C. Elements 210A, 210B, and 210C are, respectively, the customized settings for a subscription A, a subscription B, and a subscription C.

The customized settings include display preferences for the subscriptions, which may be used to create the interface for any number of users. In some embodiments of the invention, the display preferences, and thus the user interface displayed on a client computer when a web page is rendered from a server using those display properties, may be uniform for all of a subscriptions' users. In an alternate embodiment of the invention, a subscription's users may be divided into subgroups, for example, administrative users and regular users, and each subgroup may have uniform display preferences and interface. In a further embodiment of the invention, the display preferences may be unique to each user. In some embodiments of the invention, wherein the display preferences are uniform for more than one of a subscriptions' users, the data store 208 comprising information about the users may comprise an identifier for one or more administrative users of an organization's subscription who are the only users with permission to edit the display preferences. The data store 208 may also comprise information on permission levels or users with regard to web applications, such that display preferences may be configured not to display elements associated with a web application to which a user or group of users does not have access.

In some embodiments of the invention, display preferences may be reflected in the manner in which elements of a list are displayed to a user in a navigation bar of a web page displayed on a client computer. The elements of the list that compose the navigation bar may be an icon or a picture for the function, text describing the function, a combination of picture and text, or an identifier according to any other suitable technique for displaying information. Each element may also be a link to a web application component, such as a link directly to a web page (either associated with the same web application or associated with a different web application) or a link to a collection of web pages such as a folder in a web server's file system. In the latter example, the folder may be configured to display a default web page when a user's web browser navigates to it. A further example of a web application component is an active object associated with a script containing instructions to be executed on either a client computer or a server to carry out a specific task or specific tasks. It should be appreciated that this list of web application components is merely exemplary, and that an element of a list in a navigation bar may link to any suitable component of a web application.

A user may edit the display preferences, either for himself or herself or for a group of users, by providing information that specifies that when a web page is rendered that elements of the list may be shown, hidden, added, removed, renamed, or reorganized in a hierarchy. In this manner, a user may customize a navigation bar such that it allows for more easy interaction with a web application in the manner in which the user is using the web application. For example, if a user determines that he or she uses a function of a web application more often than other functions, that user may choose to put the element linking to the web application component hosting that function first in the list of elements in the navigation bar.

In another example, a user may find that he or she is not using a particular function of a web application, and may choose to remove the element associated with that function from the list of elements in the navigation bar. Alternatively, the user in the previous example may choose to "hide" the element in the list so that it is preserved by the server 106 and does not have to be recreated in the event the user does want to use that function, but is not displayed in the list of elements in the navigation bar.

In a further example, a user may choose to rename an element of the list in the navigation bar to make the web application easier to use (e.g., renaming "Business Contact Manager" to "Contacts"). In another example, a user may choose to reorganize the elements of the list into a hierarchy, such that some elements are grouped together.

It should be appreciated that a web application or a web application may have multiple navigation bars implemented on different web pages. Embodiments of the invention may operate on multiple navigation bars rendered according to multiple sets of display preferences, multiple navigation bars rendered according to a single set of display preferences, or on a single navigation bar rendered according to a single set of display preferences.

Figure 3:
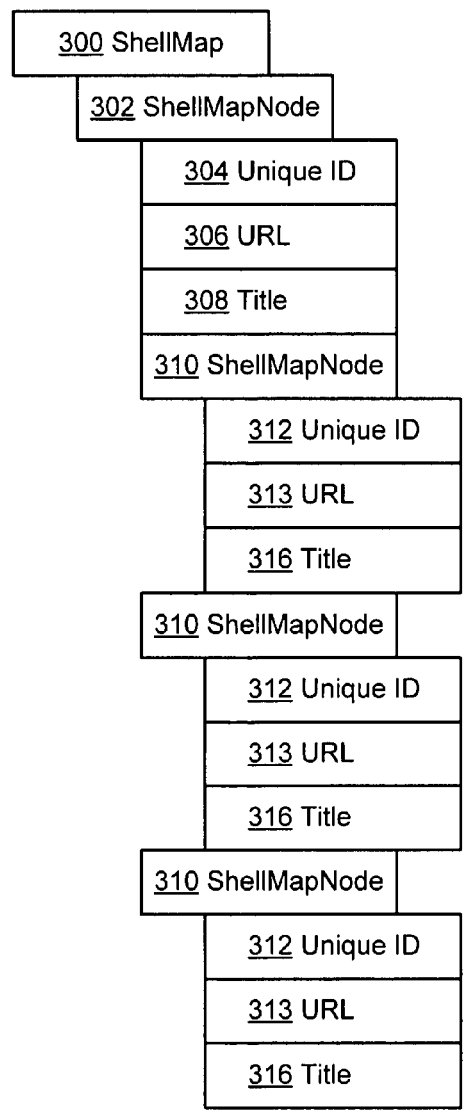
FIG. 3 is an illustrative example of a data structure that may be used to store display preferences in accordance with one embodiment of the invention.

An illustrative data structure, in accordance with some embodiments of the invention, that may be implemented to store display preferences is shown in FIG. 3. The illustrative data structure hierarchy begins with a top-level node 300, called the ShellMap node. Within the ShellMap node 300 is a ShellMapNode 302, which comprises a unique identifier for the node 304, a link to at least one web application component 306, and a title for the element 308. In addition, ShellMapNode 302 comprises three sub-elements 310, also termed ShellMapNode because they have the same structure in this illustrative example. In this way, an element in a list may be a container for a group of elements that are associated with one another, creating a hierarchy of elements. Each of the sub-elements (ShellMapNode 310) has a unique identifier 312, a link to at least one web application component 314, and a title 316. While none of these ShellMapNodes 310 are shown having elements below them in a hierarchy, it should be appreciated that each ShellMapNode 310 may contain any number of elements below it in a hierarchy. In addition, it should be appreciated that while ShellMapNode 302 is shown comprising three sub-elements, ShellMapNode 302 may comprise any number of elements below it in a hierarchy. Though FIG. 3 does not expressly show a subscription with which this data is associated, a data structure may be associated with other data in any suitable manner. For example, some embodiments of the invention may implement a database having a list of subscriptions associated with references to display properties data structures.

FIG. 4 shows an exemplary data structure 400 as laid out in FIG. 3. A top-level node ShellMap is shown comprising one ShellMapNode element with a unique identifier, a link to a web application component, and a title (which, in the example illustrated, is blank). This ShellMapNode element further comprises seven sub-elements, each of which has a unique identifier (e.g., "2003"), a title "Business Contact Manager"), a link to a web application component (e.g., the folder "WebBCM"). Each of the sub-elements relates to an element in the list of portion 300, such as "Project Manager," "Time Manager," and "Document Manager." As discussed, when a user edits his or her display preferences, this list may be re-ordered and elements may be shown, hidden, added, removed, renamed, or reclassified in the hierarchy (i.e., making a sub-element a sub-sub-element of another sub-element, for example) according to the user's preferences.

It should be appreciated that embodiments of the invention may operate using different data structures than the one shown in FIGS. 3 and 4, or a data structure having fewer or more data fields. For example, in one embodiment of the invention a linked list structure may be implemented according to the outline of FIG. 3 rather than the markup language format of FIG. 4. Alternatively, the data may be stored in a less structured format, such as a flat data file without the hierarchy of FIG. 4. In addition, data structures implemented by embodiments of the invention may have more data fields than are shown in FIG. 3, such as another field indicating whether an element or sub-element should be hidden or shown in a list, or a field indicating an element's order in a list.

Referring again to FIG. 2, computer-readable media 116 may further comprise web application code 212 comprising web pages to transmit to client computers requesting use of the web application. These web pages may comprise interfaces for functionality for the web application. The web application code 212 may further comprise computer-executable instructions for processing data stored on storage media 116 and/or data entered by a user and transmitted to the server 106, both for customizing display preferences and for carrying out the functions of the web applications. This web application code 212 may be used by server 106 in rendering data to be sent to a client computer.

The web application code 212 may be used to edit display preferences, though any suitable mechanism may be used to obtain information defining user preferences. In some embodiments of the invention, web application code 212 may comprise a web page having links to computer-executable instructions, such as scripts or other tools, for editing the data structure as shown in FIGS. 3 and 4. In some embodiments of the invention, the order of elements in the list rendered to a user in the navigation bar may be directly linked to the order of elements in the data structure, and the titles of the elements in the list is equivalent to the titles of elements in the list shown in portion 500 (in FIG. 5A). Accordingly, in some embodiments of the invention a user may navigate to a customization web page and be able to select an element of the list in the navigation bar and, by selecting a link to a script (or other suitable tool) for editing display preferences, select to reorder the list by moving the element up or down. When the user selects the link on the client computer, the change desired and the element selected are transmitted to the server 106, and the computer-executable instructions of the tool associated with the link may access the data structure containing the display preferences in memory and alter the data structure to move the element up or down in the list according to the user's input. If a user selects to rename an element of the list, the renaming tool may access the data structure and edit the element's title 316. Such an editing of the data structure may be done in any suitable manner, and should be within the ability of one of ordinary skill in the art.

It should be appreciated that the techniques described for editing the display preferences file are merely exemplary, and that embodiments of the invention may implement any suitable technique for obtaining a data structure containing display preferences.

Figure 5A:
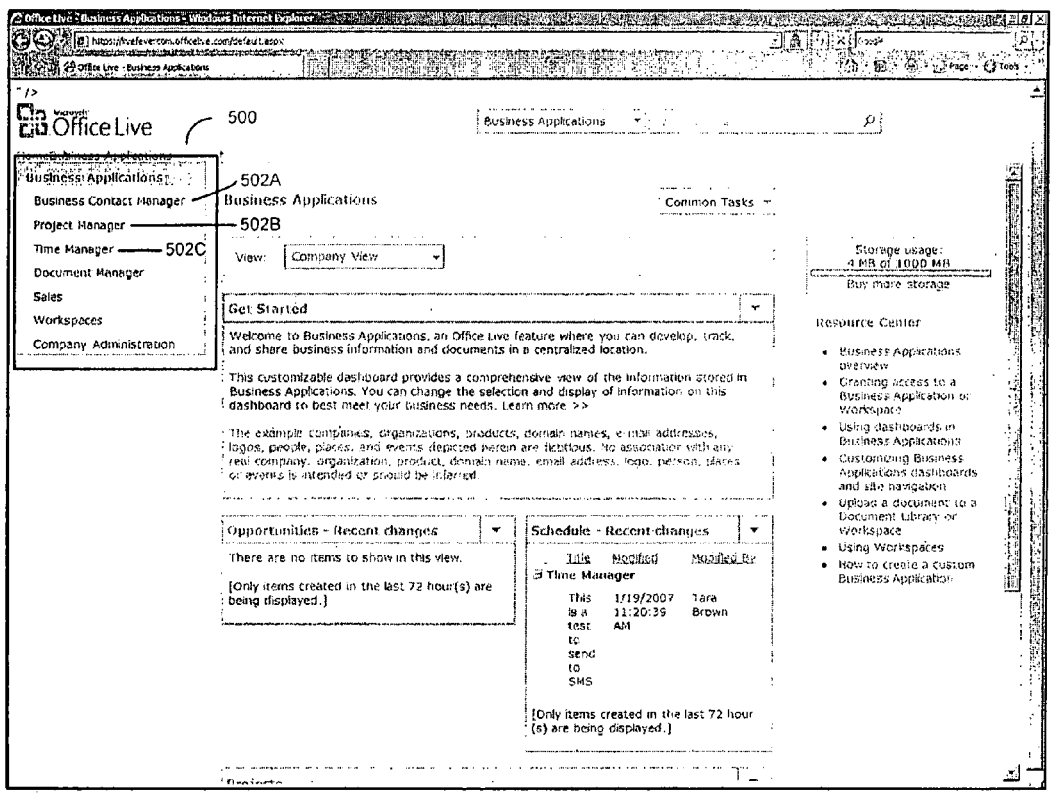
FIG. 5A is an image depicting an illustrative example of a web page having a navigation bar that may be used in accordance with embodiments of the invention.

The web application code 212 may further comprise computer-executable instructions for rendering data according to the display preferences as stored in the data structure of FIG. 4. FIG. 5A is an exemplary web page rendered by the server 106 according to display preferences and provided to a client computer. In FIG. 5A, the portion is a navigation bar. As discussed above, elements of a navigation bar may be an icon or a picture for a function, text describing a function, a combination of picture and text, or an identifier according to any other suitable technique for displaying information. In the example of FIG. 5A, a navigation bar is shown with text links to other web application components such as web pages for other functions, such as "Business Contact Manager" 502A, "Project Manager" 502B, and "Time Manager" 502C. This information was retrieved, in accordance with some embodiments of the invention, from the data structure shown in FIG. 4, rendered by server 106, and transmitted to a client computer. The title of element 502A, for example, matches the title 316 of one ShellMapNode 310 in the data structure 400.

Figure 5B:
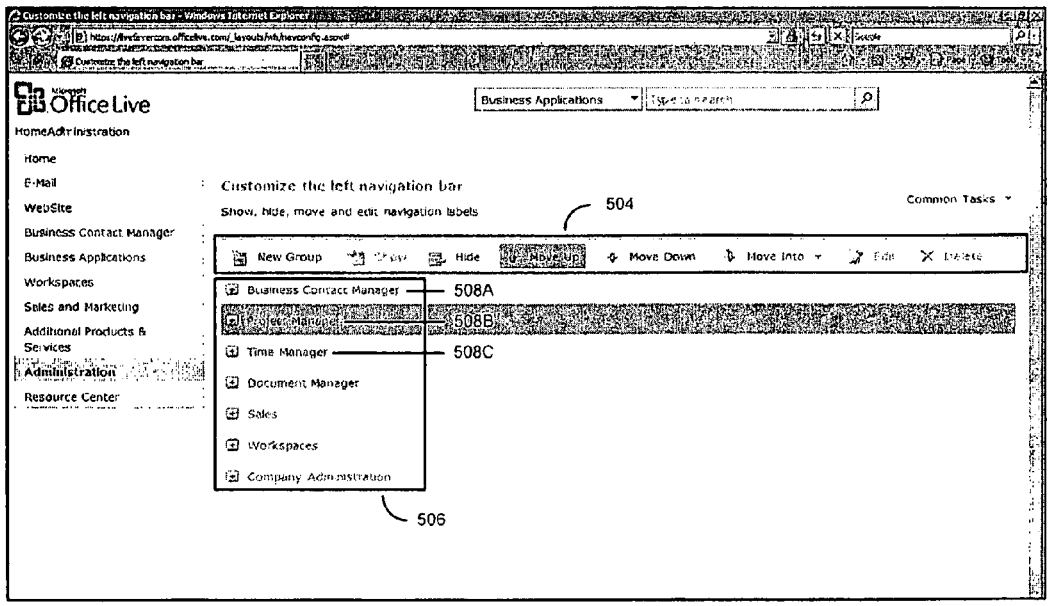
FIG. 5B is an image depicting an illustrative example of a web page having tools for editing display preferences that may be used in accordance with embodiments of the invention.

In some embodiments of the invention, the elements of the list may be customized by the user using a web page such as the one shown in FIG. 5B. As described above, FIG. 5B depicts a web page having a portion 506 similar to the portion 500, as well as a set of links 504 to tools for editing the list. Links 504 access tools for creating new elements, displaying items in the list, hiding elements of the list, moving elements up in an order, moving elements down in the order, sorting elements into a hierarchy, renaming elements, and deleting elements. Using these tools, a user can set display preferences that regulate how the portion 500 is rendered and thereby customize the interface to his or her needs. It should be appreciated, however, that this list of tools is merely exemplary, and embodiments of the invention may offer any type and number of tools that may be used for customizing a list of information.

It should be appreciated that some embodiments of the invention may not implement a customization web page for editing display preferences, or more implement more than one method for editing display preferences. In some embodiments of the invention, a user may be able to upload a display preferences file to the web application that may be processed and stored by computer-executable instructions that are a part of web application code 212. In another embodiment, a user may be able to dynamically edit the elements of the list in the navigation bar while they are being displayed (e.g., re-ordering using "drag and drop" functionality) and not use a specific web page and specific tools for editing the display preferences.

Figure 5C:
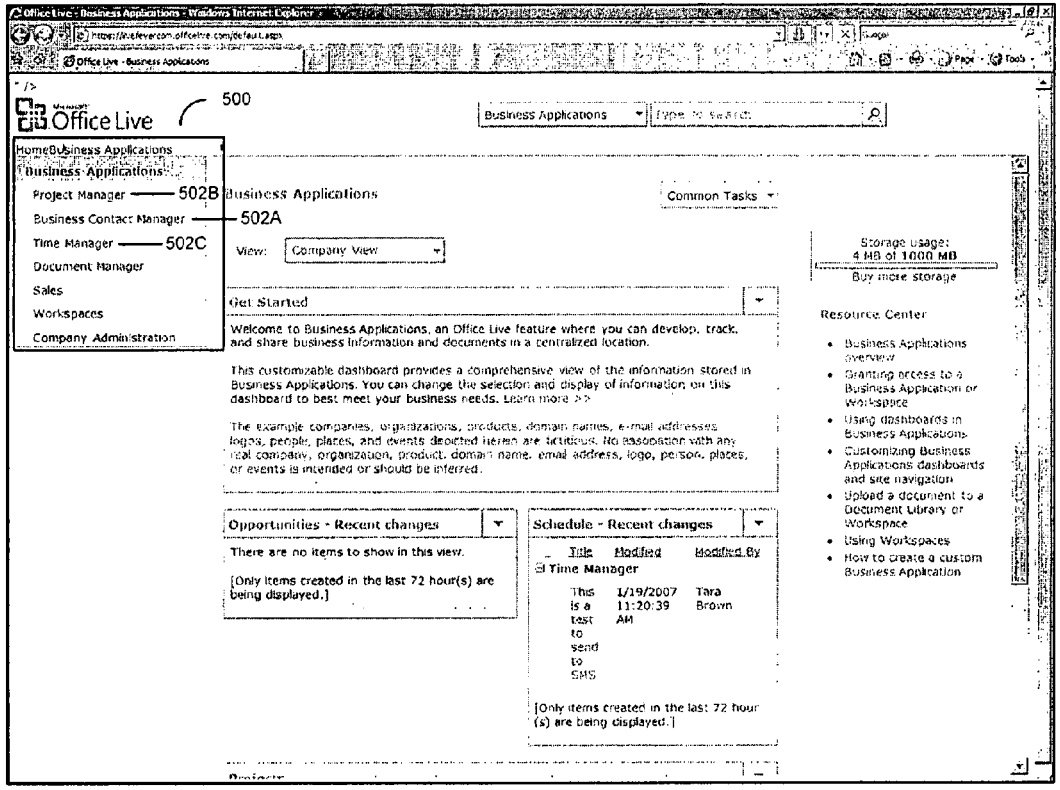
FIG. 5C is an image depicting an illustrative example of a web page having a navigation bar that may be used in accordance with embodiments of the invention.

FIG. 5C depicts the web page of FIG. 5A having a portion 500 that has been edited by the tools of FIG. 5B and therefore having a list with a different order of elements. As can be seen, while in FIG. 5A element 502A was at the top of the list of elements in the navigation bar, in FIG. 5C element 502B is at the top of the list.

Figure 6:
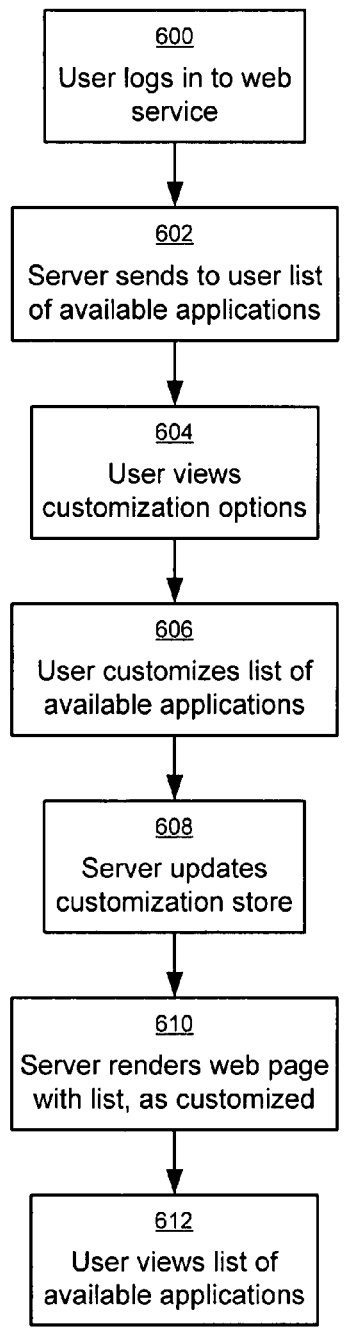
FIG. 6 is a flow chart of a process of editing display preferences in accordance with one embodiment of the invention.

FIG. 6 shows an exemplary process by which a user may customize display preferences which are used by a server 106 to render a web page.

The process starts with act 600, wherein the user logs in to the web application and is sent, in act 602, a web page comprising a portion having a list of elements corresponding to available applications (e.g., FIG. 5A). In act 604, the user chooses to edit his or her display preferences and views the customization options, such as the portion 506 comprising the list of elements and the links to tools 504 as shown in FIG. 5B. Using the example of FIGS. 5A and 5C, in act 606 the user uses the tools to edit the display preferences by selecting element 508B in the portion 506 of FIG. 5B and selecting the link to the tool to move that element up in the list. Once the user indicates that he or she is temporarily finished editing his or her display preferences—such as by selecting a "save" button, closing the window, or in any other suitable manner—the server then updates the data structure storing display preferences in act 608 according to the edits requested by the user. In act 610, the server renders a new web page according to the updated display preferences and, in act 612, the user is sent and views a web page comprising a portion having a list of elements such as a list of available applications, such as portion 500 shown in FIG. 5C wherein element 502B is now above element 502A in the list of elements in the navigation bar.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface including keyboards, and pointing devices, such as mice, touch pads, and digitizing tables. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method comprising:
   operating at least one programmed processor to carry out acts identified by executable instructions with which the at least one programmed processor is programmed, the acts comprising:
   displaying to a user of a web application a web page, wherein displayed content of the web page comprises:
   i) a list of elements, the elements each associated with at least one of a plurality of web application components of the web application, the web application comprising a plurality of web pages to perform at least one function, a first web application component of the plurality of web application components comprising at least one first web page to perform a first function to edit first data in a first data store and a second web application component of the plurality of web application components comprising at least one second web page to perform a second function to edit second data in a second data store, and
   ii) at least one link to at least one tool for editing display preferences for the list of elements each associated with at least one of the plurality of web application components of the web application;
   detecting and storing edits made to the display preferences for the list of elements using the at least one tool, the storing comprising storing the edits made to the display preferences for the list of elements in connection with a subscription with which the user is associated; and
   rendering for display to at least one user associated with the subscription, based on the display preferences for the list of elements that are associated with the subscription, a portion of at least one web page associated with the web application.

2. The method of claim 1, wherein an element of the list is a link to at least one web application component, and the portion of the web page comprises a navigation section comprising a list of links to the plurality of web application components.

3. The method of claim 1, wherein a web application component is a web page associated with the web application or a container for web pages associated with the web application.

4. The method of claim 1, wherein the at least one tool for editing the list comprises at least one tool from a group consisting of tools for hiding, showing, re-ordering, renaming, rearranging in a hierarchy, adding, and removing elements of the list, and
an edit made to the display preferences by the user comprises at least one of hiding, showing, re-ordering, renaming, rearranging in a hierarchy, adding, and removing elements of the list.

5. The method of claim 1, wherein rendering the portion of the web page comprises rendering the portion of the web page using the display preferences for a plurality of users sharing the subscription to the web application.

6. The method of claim 5, wherein rendering the portion of the web page for each of a plurality of users comprises rendering the portion based on display preferences provided by an administrator for the subscription.

7. The method of claim 1, wherein rendering the portion of the web page comprises rendering the portion of the web page using the display preferences unique to each user of the web application.

8. The method of claim 1, wherein the act of rendering is performed after receiving an indication from the user that the user is temporarily finished editing the display preferences.

9. The method of claim 1, wherein the act of rendering is performed upon receiving each edit made by the user as the user is making edits to the display preferences.

10. An apparatus comprising:
at least one computer-readable storage medium having encoded thereon a plurality of structures each for storing computer-readable data identifying display preferences for a particular subscriber, the structure comprising:
at least one element, each element comprising:
a unique identifier for the element;
a link to at least one web application component;
a title for the element; and
a number of sub-element links, each sub-element link comprising a reference to a sub-element having the same structure as an element,
wherein each web application component identified in the structure is related to a web application that comprises a plurality of web pages and performs at least one function to edit data in a data store, a first web application component of the at least one web application component comprising at least one first web page to perform a first function to edit first data in a first data store and a second web application component of the at least one web application component comprising at least one second web page to perform a second function to edit second data in a second data store, the first data being different from the second data and the first function being different from the second function; and
at least one processor adapted to:
receive at least one request to provide a web page to a requesting client computer;
determine an associated subscriber with which the requesting client computer is associated;
create, based on a structure of the plurality of structures that is associated with the associated subscriber, a navigation bar comprising a plurality of entries and at least one link to at least one tool for editing the display preferences identified by the structure, wherein an order of sub-element links and the title of each element in the structure identify the display preferences that are used in creating each entry of the navigation bar; and
respond to each of the at least one request with a web page comprising content and the navigation bar.

11. The apparatus of claim 10, wherein a web application component is a web page associated with the web application or a container for web pages associated with the web application.

12. At least one computer-readable storage medium having encoded thereon computer-executable instructions which, when executed, instruct a computer to carry out a method, the method comprising:
retrieving, for a subscription, a set of display preferences for a list of elements, each element associated with at least one web application component of a web application, the web application comprising a plurality of web pages to perform at least one function, each web application component being related to a function of a web application that performs a function to edit data in a data store, a first web application component of the at least one web application component comprising at least one first web page to perform a first function to edit first data in a first data store and a second web application component of the at least one web application component comprising at least one second web page to perform a second function to edit second data in a second data store, the first data being different from the second data, the display preferences comprising a desired contents and ordering of the list of elements;
rendering, based at least in part on the display preferences for the subscription, a first web page comprising:
i) at least one link to at least one tool for editing the display preferences of the list of elements, and
ii) the list of elements, wherein rendering the first web page comprises rendering the list of elements according to the desired contents and ordering of the display preferences;
detecting and storing edits made to the display preferences for the subscription by a user of the web page; and
rendering, based at least in part on edited display preferences for the subscription, a second web page comprising the list of elements according to the display preferences.

13. The method of claim 12, wherein an element of the list is a hyperlink to a web application component, and the portion of the web page comprises a navigation section comprising at least one hyperlink to the at least one other web page.

14. The method of claim 12, wherein a web application component is a web page associated with the web application or a container for web pages associated with the web application.

15. The method of claim 12, wherein the at least one tool for editing the list comprises at least one tool from a group consisting of tools for hiding, showing, re-ordering, renaming, rearranging in a hierarchy, adding, and removing elements, and
an edit made to the display preferences by the user comprises at least one of hiding, showing, re-ordering, renaming, rearranging in a hierarchy, adding, and removing elements of the list.

16. The method of claim 12, wherein rendering the second web page comprising the list of elements comprises rendering the second web page comprising the list of elements using the display preferences for a plurality of users sharing the subscription to a web application.

17. The method of claim 16, wherein the rendering the second web page comprising the list of elements for each of a plurality of users comprises rendering the portion based on display preferences provided by an administrator for the subscription.

18. The method of claim 12, wherein rendering the second web page comprising the list of elements comprises rendering the second web page comprising the list of elements using the display preferences unique to each user of the web application.

19. The method of claim 12, wherein the act of rendering a second web page is performed after receiving an indication from the user indicating that the user is temporarily finished editing the display preferences.

20. The method of claim 12, wherein the act of rendering a second web page is performed upon receiving each edit made by the user as the user is making edits to the display preferences.

\* \* \* \* \*